United States Patent
Matsushita

Patent Number: 5,212,836
Date of Patent: May 18, 1993

[54] POWER SOURCE CONTROL CIRCUITRY FOR AN AUTOMOTIVE PORTABLE TELEPHONE

[75] Inventor: Akimasa Matsushita, Tokyo, Japan

[73] Assignee: NEC Corporation, Japan

[21] Appl. No.: 647,791

[22] Filed: Jan. 30, 1991

[30] Foreign Application Priority Data

Jan. 30, 1990 [JP] Japan ................................ 2-21293

[51] Int. Cl.⁵ ...................... H04B 1/16; H04M 11/00
[52] U.S. Cl. .................................. 455/343; 455/127; 379/58; 379/61
[58] Field of Search ...................... 455/89, 90, 99, 127, 455/345, 346, 351, 343; 379/58, 61, 63; 320/2; 307/86, 10.6

[56] References Cited

U.S. PATENT DOCUMENTS

| | | | |
|---|---|---|---|
| 4,286,683 | 9/1981 | Zeigner | 307/10.6 |
| 4,752,949 | 6/1988 | Steinbeck | 379/63 |
| 4,893,348 | 1/1990 | Andoh | 455/343 |
| 4,916,729 | 4/1990 | Usui | 455/127 |
| 4,974,250 | 11/1990 | Tomiyori | 379/58 |
| 5,056,153 | 10/1991 | Taniguchi | 455/89 |

FOREIGN PATENT DOCUMENTS 0343571 5/1989 European Pat. Off. .
0370759 11/1989 European Pat. Off. .

Primary Examiner—Reinhard J. Eisenzopf
Assistant Examiner—Philip J. Sobutka
Attorney, Agent, or Firm—Ostrolenk, Faber, Gerb & Soffen

[57] ABSTRACT

Power source control circuitry for an automotive portable radio telephone which is powered by a power source mounted on a motor vehicle via an adapter. When the telephone is mounted on the adapter, power is fed from the on-board power source to the adapter and telephone. When the telephone is removed from the adapter, the adapter is disconnected from the battery to eliminate wasteful supply of power from the power source to the adapter.

5 Claims, 3 Drawing Sheets

5,212,836

POWER SOURCE CONTROL CIRCUITRY FOR AN AUTOMOTIVE PORTABLE TELEPHONE

BACKGROUND OF THE INVENTION

The present invention relates to power source circuitry built into a portable radio telephone and, more particularly, to power source control circuitry for a portable radio telephone for automotive use which is powered by an on-board power source, or battery, via an adapter.

A mobile radio telephone implemented as a portable telephone for use on a motor vehicle is mounted on an adapter which is connected to an on-board power source or battery. Power source control circuitry is connected between the battery and the adapter to control the supply of power from the battery to the telephone through the adapter which serves as an interface. Conventional power source control circuitry has a switch circuit for switching the connection of the battery and adapter on and off, a power ON/OFF sensing circuit responsive to a turn-on and turn-off power switch built into the telephone, and a switch control circuit for controlling the switch circuit. Implemented by a flip-flop, the power ON/OFF sensing circuit inverts, every time the power switch is turned on or off, the logical level of the resultant line pulse and holds the inverted output thereof. The switch control circuit ANDs the output of the power ON/OFF sensing circuit and the output of an ignition switch of the vehicle to turn on the switch circuit, thereby establishing the connection of the battery and adapter. Once the power ON/OFF sensing circuit inverts the logical level in response to an ON output of the power switch of the telephone, it holds the inverted output thereof since it is implemented by a flip-flop, as mentioned above. As a result, once the power switch of the telephone is turned on, the connection of the battery and adapter is switched on and off solely by the ON/OFF signal of the ignition switch. This brings about a problem that even when the telephone is removed from the adapter which is connected to the battery, power is wastefully fed from the battery to the adapter, causing unnecessary power consumption.

SUMMARY OF THE INVENTION

It is therefore an object of the present invention to provide power source control circuitry for an automotive portable ratio telephone which saves battery power.

It is another object of the present invention to provide generally improved power source control circuitry for an automotive portable radio telephone.

Power source control circuitry for an automotive portable radio telephone which is powered by a power source mounted on a motor vehicle of the present invention comprises a switch circuit for switching the connection of the power source of the vehicle and the adapter and telephone on and off, an ignition sensing circuit for sensing an output signal of an ignition system incorporated in the vehicle, a power ON/OFF sensing circuit connected to the power switch of the telephone for inverting, every time the power switch produces an ON/OFF pulse, the output state of the power ON/OFF sensing circuit and holding the inverted output state, and a control circuit for controlling the switching circuit in response to an output of the ignition sensing circuit and an output of the power ON/OFF sensing circuit such that when the telephone is removed from the adapter, the switching circuit interrupts the connection of the power source and adapter.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
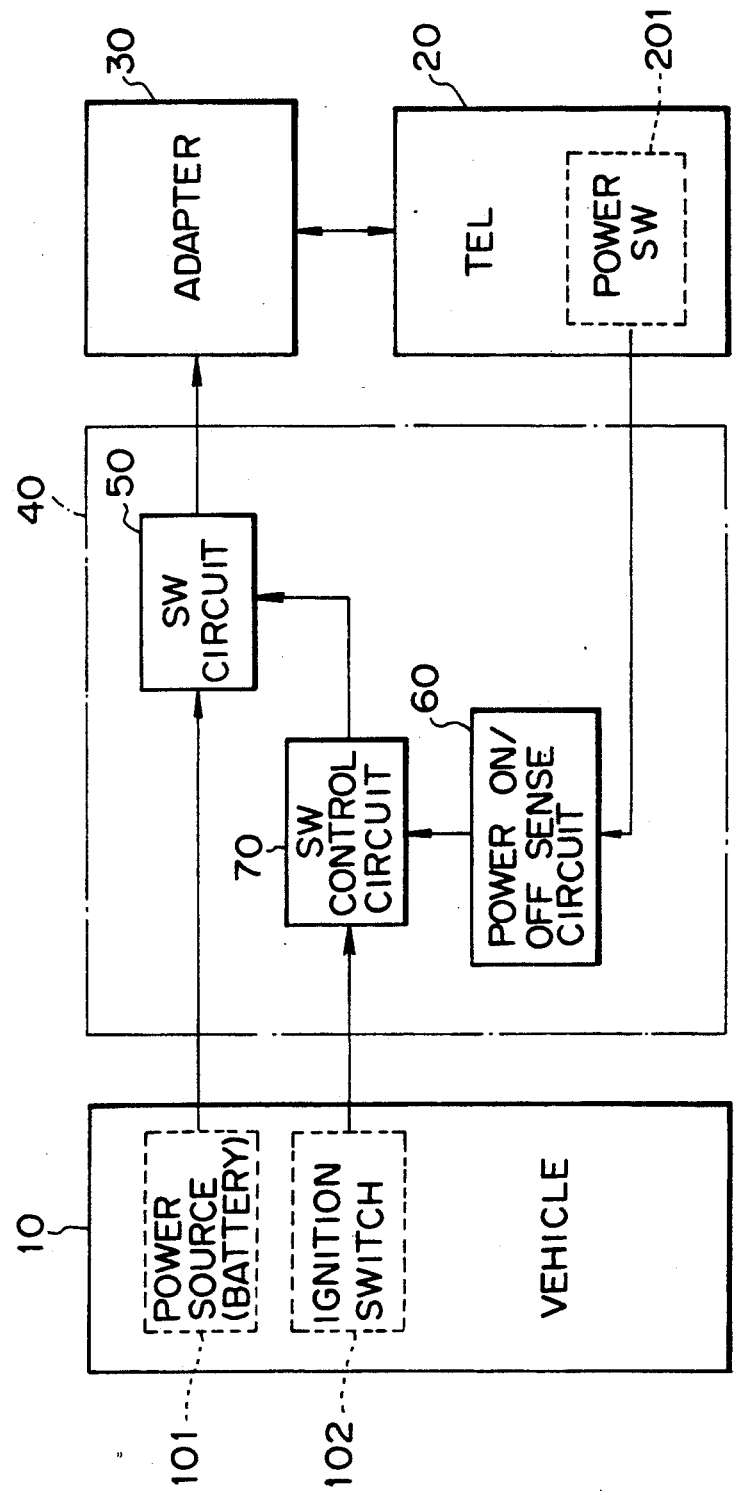
FIG. 1 is a block diagram schematically showing conventional power source control circuitry for an automotive portable radio telephone.

To better understand the present invention, a brief reference will be made to prior art power source control circuitry for an automotive portable radio telephone, shown in FIG. 1. In the figure, there is shown a motor vehicle 10 having a power source in the form of a battery 101 and an ignition switch 102. A portable radio telephone mounted on the vehicle 10 has a power switch 201 and is connected to an adapter 30 also mounted to the vehicle 10 and to power source control circuitry, generally 40. Power from the battery 101 is fed to the telephone 20 via the adapter 30 under the control of the control circuitry 40. The control circuitry 40 has a switch circuit 50 for switching the connection of the battery 101 and adapter 30 on and off. A power ON/OFF sensing circuit 60 is implemented by a flip-flop and, every time the power switch 201 of the telephone 20 is turned on or off, the logical level of the resultant line pulse is inverted. A switch control circuit 70 turns on the switch circuit 50 on the basis of AND of the power ON/OFF sensing circuit 60 and the output of the ignition switch 102, thereby setting up the connection of the battery 101 and adapter 30. On the connection of the adapter 30 to the battery 101, power is fed from the battery 101 to the adapter 30 and further to the telephone 20 via the adapter 30.

The power ON/OFF sensing circuit 60 implemented by a flip-flop inverts the logical output level thereof in response to an ON signal from the power switch 201 and thereby turns on the switch circuit 50. The inverted logical level of the circuit 6 is maintained thereafter. Hence, once the power switch 201 is turned on, the switch circuit 50 and, therefore, the connection of the battery 101 and adapter 30 is turned on and off solely by the ON/OFF output of the ignition switch 102. It follows that even when the telephone 20 is not mounted on the adapter 30 connected to the battery 101, i.e., when the power switch 201 is disconnected from the power ON/OFF sensing circuit 60, the adapter 30 still remains connected with the battery 101. In this condition, the power continuously fed from the battery 101 to the adapter 30 is simply wasted. This is not desirable from a power saving standpoint.

Figure 2:
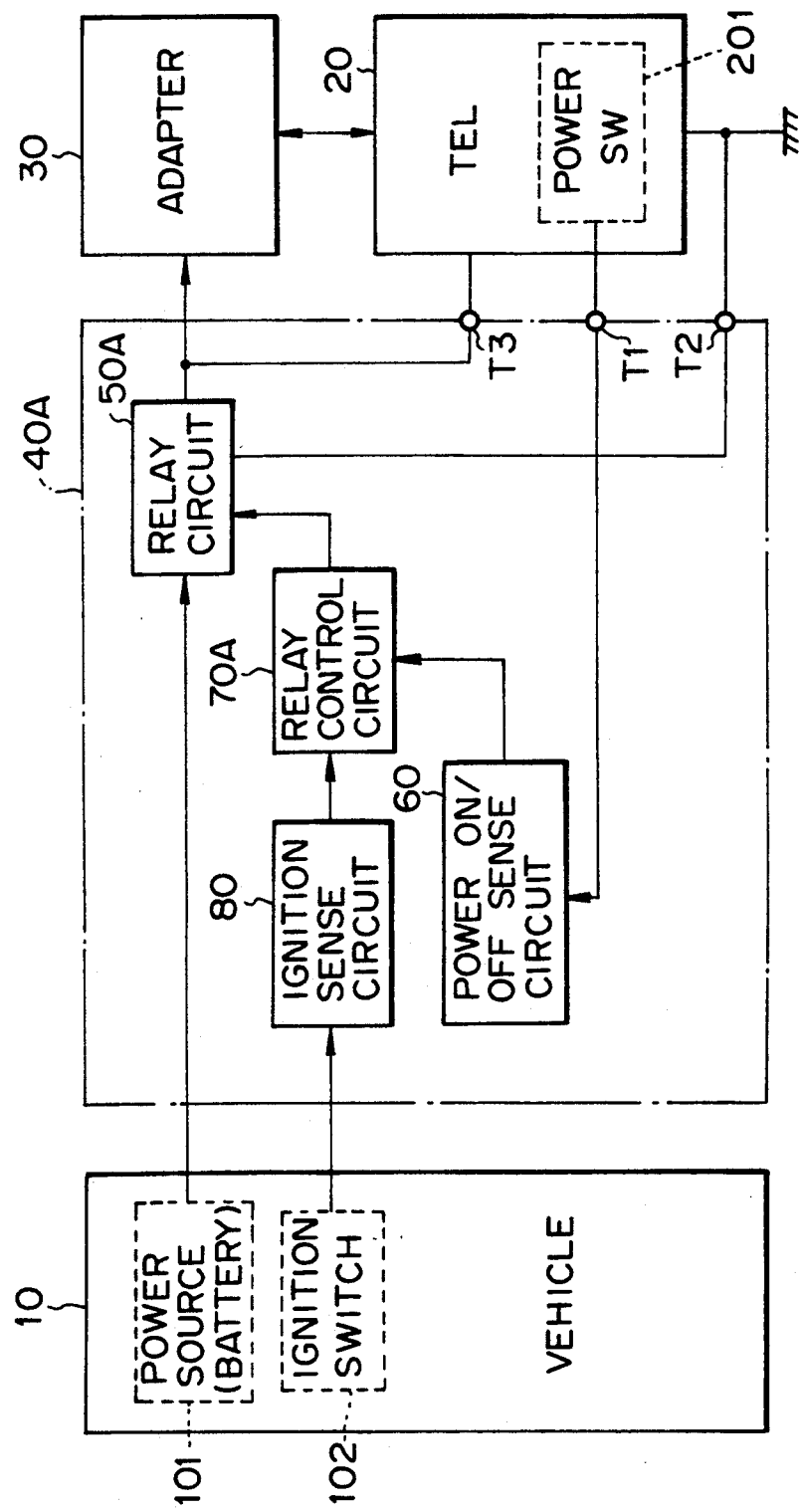
FIG. 2 is a block diagram schematically showing power source control circuitry embodying the present invention.

Referring to FIG. 2, power source control circuitry embodying the present invention will be described. In the figures, the same or similar components are designated by like reference numerals, and redundant description will be avoided for simplicity. As shown, the control circuitry, generally 40A, differs from the prior art circuitry 40 in that it has an ignition sensing circuit 80 for sensing the output of an ignition switch 102, a relay circuit 50A which is a substitute for the conventional switch circuit 50, and a relay control circuit 70A replacing the switch control circuit 70. In the illustrative embodiment, the control circuitry 40A is connected to a telephone 20 via contacts T1, T2 and T3. Specifically, the relay circuit 50A includes a relay switch whose relay coil is connected to the terminal T2 via a switching transistor, the terminal T2 being connected to ground.

Assume that the telephone 20 is mounted on the adapter 30 and connected to the control circuitry 40A via the terminals T1, T2 and T3, and that the ignition sensing circuit 80 has sensed an ON signal generated by the ignition switch 102 of the vehicle 10. Then, on the turn-on of the power switch 201 of the telephone 20, the relay control circuit 70A closes the relay switch of the relay circuit 50A and thereby connects the battery 101 to the adapter 30 and telephone 20. As a result, power is fed from the battery 101 to the adapter 30 and telephone 20. Of course, the supply of power will be interrupted when the output of the ignition switch 102 turns from ON to OFF.

On the other hand, when the telephone 20 is removed from the adapter 30 and is not connected to the control circuitry 40A, no current flows through the relay coil of the relay switch of the relay circuit 50A although the ignition switch 30 may generate an ON signal. Hence, the battery 101 is not connected to the adapter 30 or the telephone 20. So long as the telephone 20 is not connected to the control circuitry 40A, the power from the battery 101 is not fed even to the adapter 30 at all despite the connection of the adapter 30 to the control circuitry 40A. This is because the relay coil of the relay switch of the relay circuit 50A and the ground terminal T2 of the telephone 20 are disconnected from each other, interrupting the flow of a current from the battery 101 to the relay coil.

Figure 3:
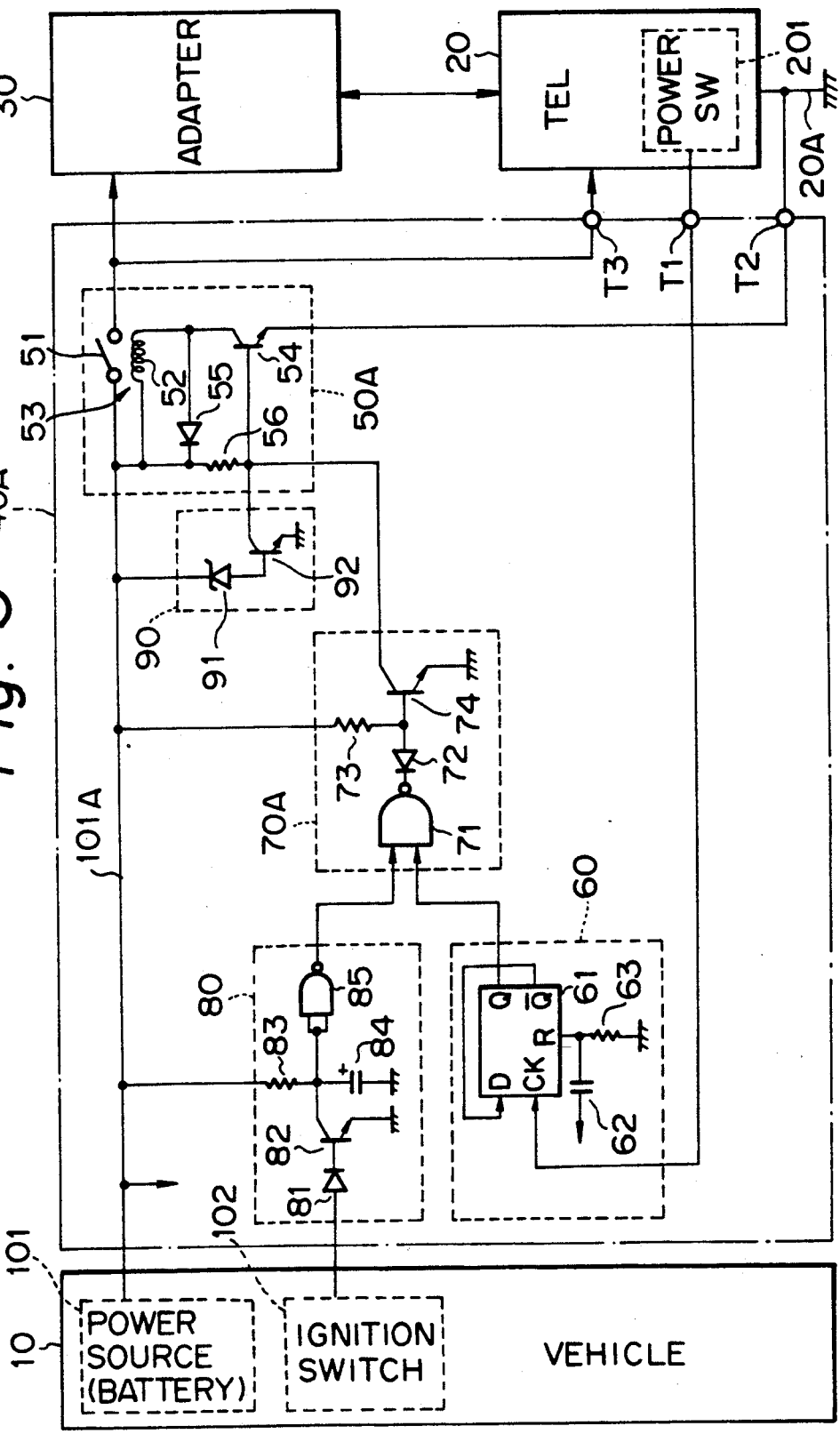
FIG. 3 is a circuit diagram showing a specific construction of the illustrative embodiment.

FIG. 3 shows a specific construction of the power source control circuit 40A. As shown, the ignition sensing circuit 80 has a diode 81 to block reverse current, a switching transistor 82, a pull-up resistor 83, a capacitor 84, and a NAND gate 85. The capacitor 84 protects the circuit 80 against malfunctions possibly resulting from chattering which is caused by the ON signal from the ignition switch 102. The ignition sensing circuit 80 produces a high-level or "H" output in response to the "H" or ON signal from the ignition switch 102 or produces a low-level or "L" output in response to the "L" or OFF signal from the ignition switch 102. A power ON/OFF sensing circuit 60 is made up of a D flip-flop 61, a capacitor 62, and a resistor 63. The capacitor 62 and resistor 63 constitute a power ON reset circuit and resets the D flip-flop 61 a predetermined period of time when power is fed to the adapter 30 for the first time. The power ON/OFF sensing circuit 60, therefore, produces a "L" output in the initial stage after the power supply and, thereafter, repetitively produces a "H" and a "L" output every time the power switch 201 of the telephone 20 is turned on and off. The relay control circuit 70A has a NAND gate 71, an diode 72 to block reverse current, a pull-up resistor 73, and a switching transistor 74. Assuming that the output of the power ON/OFF sensing circuit 60 is "L", the control circuit 70A produces "L" with no regard to the output level of the ignition sensing circuit 80. On the other hand, when the output of the power ON/OFF sensing circuit 60 is "H", the control circuit 70A produces "L" if the output of the ignition sensing circuit 80 is "L" or produces "H" if otherwise. The relay circuit 50A has a relay switch 53 constituted by a relay contact 51 and a relay coil 52, a switching transistor 53, a diode 55 which is an implementation against counter electromotive force, and a pull-up resistor 56. An anti-overvoltage circuit 90 is connected between the relay circuit 50A and the relay control circuit 70A and constituted by a Zener diode 91 and a switching transistor 92. Assume that a voltage higher than a given voltage which is determined by a voltage that turns on the Zener diode 91 and a voltage that renders the transistor 92 conductive is applied to a power feed line 101A extending from the battery 101. Then, the anti-overvoltage circuit 90 short-circuits the line 101A to protect the circuits connected to the line 101A from damage. Specifically, the output of the protection circuit 90 is "H" if the voltage of interest is normal or "L" if otherwise. The collector of the switching transistor 54 is connected to the relay coil 52 while the emitter is connected to ground via a relay control ground line 54A and the terminal T2. The transistor 54 is turned on only when three different conditions are satisfied, i.e., that the output level of the protection circuit 90 is "H", that the output level of the relay control circuit 70A is "H", and that the relay control ground line 54A is connected to a ground line 20A associated with the telephone 20. On the turn-on of the transistor 54, the relay coil 52 is energized to in turn close the relay contact 51 with the result that the battery 101 is caused to connect with the adapter 30 and telephone 20. When the telephone 20 is removed from the adapter 30, the emitter of the transistor 54 and the ground line 20A of the telephone 20 are disconnected, i.e., one of the three conditions stated above is not satisfied. As a result, the transistor 54 is not turned on.

In summary, it will be seen that the present invention provides power source control circuitry for an automotive portable radio telephone which, when the telephone is mounted on an adapter, allows the power from an on-board battery to be fed to the adapter and telephone and, when the telephone is removed from the adapter, interrupts the connection of the battery and adapter. This successfully eliminates the wasteful supply of power from the battery to the adapter and thereby available battery power.

Various modifications will become apparent to those skilled in the art after receiving the teachings of the present disclosure without departing from the scope thereof.

What is claimed is:

1. Power source control circuitry for an automotive portable radio telephone which is powered by a power source mounted on a motor vehicle, comprising:
    switching means for providing a switching connection between said power source of said motor vehicle and an adapter and said telephone;
    ignition sensing means for sensing an output signal of an ignition system incorporated in said motor vehicle;
    power ON/OFF sensing means connected to a power switch of said telephone for inverting, every time said power switch produces an ON/OFF pulse, an output state of said power ON/OFF sensing means and holding said inverted output state; and
    control means for controlling said switching means in response to an output of said ignition sensing means and an output of said power ON/OFF sensing means, such that when said telephone is removed from said adapter, said switching means interrupts the connection of said power source and said adapter.

2. Circuitry as claimed in claim 1, wherein said switching means comprises a relay switch and relay switch control means.

3. Circuitry as claimed in claim 2, wherein said relay switch comprises a relay contact connected between said power source and said adapter and said telephone, and a relay coil connected to said power source and ground of said telephone for opening and closing said relay contact, said relay switch control means comprising a switching transistor connected between said relay coil and ground of said telephone for selectively interrupting connection of said power source and ground of said telephone.

4. Circuitry as claimed in claim 3, further comprising:
a first terminal for feeding power to said telephone;
a second terminal for connecting said power ON/OFF sensing circuit and said power switch of said telephone; and
a third terminal for connecting said switching transistor and ground of said telephone.

5. Circuitry as claimed in claim 1, further comprising an anti-overvoltage means for short-circuiting a power feed line extending from said power source when a voltage higher than a predetermined voltage is applied to said power feed line.

* * * * *